(12) United States Patent  (10) Patent No.: US 7,885,547 B2
Nakaso et al.  (45) Date of Patent: Feb. 8, 2011

(54) OPTICAL WIRELESS TRANSMISSION SYSTEM FOR PERFORMING OPTICAL SPACE TRANSMISSION, AND OPTICAL TRANSMITTER USED THEREIN

(75) Inventors: Mariko Nakaso, Osaka (JP); Hiroyuki Sasai, Osaka (JP)

(73) Assignee: Panasonic Corporation, Osaka (JP)

( * ) Notice: Subject to any disclaimer, the term of this patent is extended or adjusted under 35 U.S.C. 154(b) by 630 days.

(21) Appl. No.: 11/934,925

(22) Filed: Nov. 5, 2007

(65) Prior Publication Data

US 2008/0107420 A1    May 8, 2008

(30) Foreign Application Priority Data

Nov. 6, 2006    (JP)  ............................... 2006-300774

(51) Int. Cl.
*H04B 10/00*    (2006.01)

(52) U.S. Cl. ........................ 398/130; 398/128; 398/129; 398/131; 398/135; 398/136; 385/89; 385/90; 385/92; 385/93

(58) Field of Classification Search ................. 398/118, 398/119, 120, 122, 123, 124, 127, 128, 129, 398/130, 131, 135, 136, 182, 183, 192, 193, 398/115, 116, 117, 121, 126, 164, 194, 200, 398/201; 385/88, 89, 90, 92, 93
See application file for complete search history.

(56) References Cited

U.S. PATENT DOCUMENTS

| | | | |
|---|---|---|---|
| 6,381,055 B1 * | 4/2002 | Javitt et al. | 398/131 |
| 7,565,082 B2 * | 7/2009 | Yazaki et al. | 398/129 |
| 2002/0131121 A1 * | 9/2002 | Jeganathan et al. | 359/152 |
| 2005/0276610 A1 | 12/2005 | Hirayama | |
| 2007/0217795 A1 * | 9/2007 | Otte | 398/212 |

FOREIGN PATENT DOCUMENTS

| JP | 2005-101853 | 4/2005 |
|---|---|---|
| JP | 2005-339025 | 12/2005 |

* cited by examiner

*Primary Examiner*—Hanh Phan
(74) *Attorney, Agent, or Firm*—Wenderoth, Lind & Ponack, L.L.P.

(57) ABSTRACT

An optical transmitter for performing high-rate data communication by means of optical space transmission is provided, which can reliably perform optical axis adjustment manually and visually, and can prevent a device from being made large in size and manufacturing cost of the device from being increased by using an simply-constructed optical transmitter. Thus, the optical transmitter of the present invention comprises an incident beam restriction section operable to allow only a visible beam which is emitted by a terminal located within a range in which an infrared beam is emitted and incident thereon to pass therethrough, a reflection section operable to reflect the visible beam which has passed through the incident beam restriction section, and a light source operable to emit the infrared beam to pass through the reflection section according to a data transmission request signal from the terminal.

19 Claims, 14 Drawing Sheets

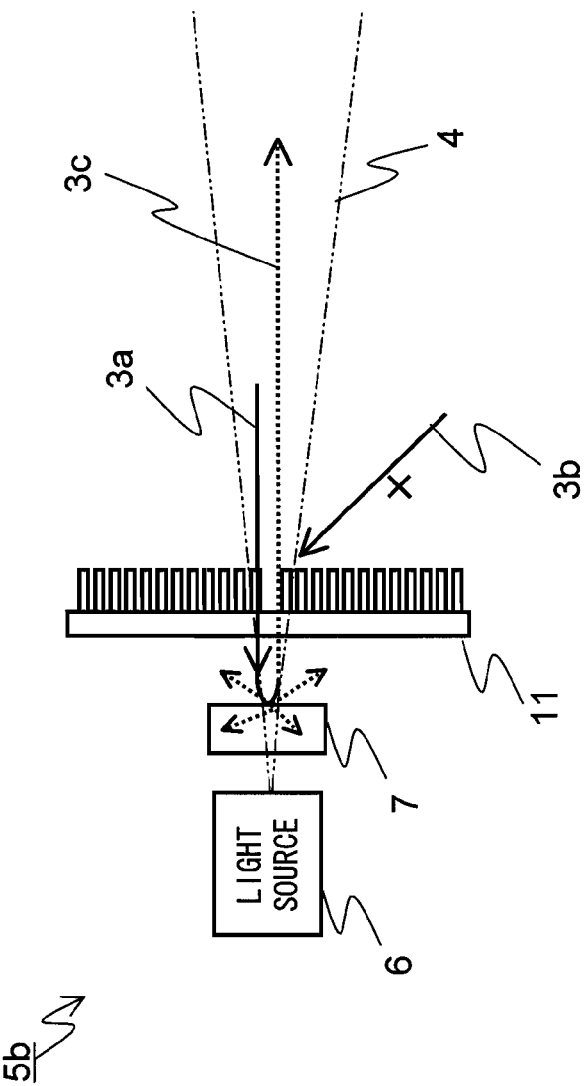
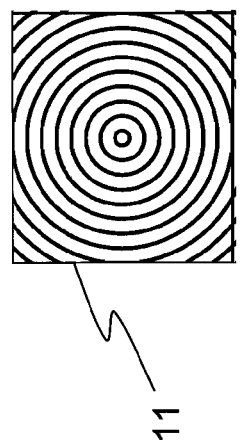

OPTICAL WIRELESS TRANSMISSION SYSTEM FOR PERFORMING OPTICAL SPACE TRANSMISSION, AND OPTICAL TRANSMITTER USED THEREIN

BACKGROUND OF THE INVENTION

1. Field of the Invention

The present invention relates to an optical transmitter and an optical wireless transmission system for transmitting data to a terminal by means of optical space transmission using an infrared beam, and more particularly to an optical transmitter and an optical wireless transmission system for performing high-rate data communication by adjusting an optical axis by moving visually a terminal into a data transmission possible range of the optical transmitter.

2. Description of the Background Art

An optical wireless transmission system which performs data communication by emitting an optical beam to a free space enables wireless connection between devices such as an information processing terminal and audio visual equipment, and the like in an office and a house. Since there is no legal restriction on usage of frequency in comparison with a wireless communication system such as a wireless LAN device, UWB, and the like, the optical wireless transmission has advantages such as that high-rate communication can be achieved using wide band characteristics of light. Thus, the optical wireless transmission system has been attracting attention in recent years. Recently, with a further increase in capacity of data communication, there is a need for an optical wireless transmission system which enables higher-rate communication.

For performing high-rate data communication between an optical space transmission apparatus which transmits data and a terminal which receives data (between the devices) by means of optical space transmission, a light receiver of the terminal generally needs higher light reception power in comparison with light reception power for performing low-rate data communication therebetween. A method is used in which the light reception power of the light receiver is increased by narrowing the directional characteristics of an optical beam which is transmitted from an optical transmitter. In this case, it is necessary to perform optical axis adjustment between the optical space transmission apparatus and the terminal. However, since a semiconductor laser of excellent high-rate modulation characteristics which emits an infrared beam, or the like is generally used in the optical wireless transmission system which enables high-rate communication, a user cannot look at a laser beam (the infrared beam). Thus, when the user performs communication while holding a terminal with his or her hand or the like, it is hard for the user to manually perform the optical axis adjustment of the terminal.

There is, for example, a method of performing optical axis adjustment in which an optical space transmission apparatus automatically searches a terminal by an optical transmitter of the optical space transmission apparatus emitting a beam in a wide range. There is, for example, a method of performing optical adjustment in which a lens is moved mechanically by MEMS (Micro Electro Mechanical Systems) or the like so that a maximum amount of received light is obtained by the light receiver of a terminal. Also, as a simple method of performing optical axis adjustment, there is a method using a visible light as follows (e.g. refer to Japanese Laid-Open Patent Publication No. 2005-101853).

FIG. 13 is a view showing a configuration of a conventional optical wireless transmission system 100 disclosed in Japanese Laid-Open Patent Publication No. 2005-101853. As shown in FIG. 13, the optical wireless transmission system 100 includes a master unit 101 and a slave unit 102. The master unit 101 includes a transmission section 103 and a reception section 104 on a base 111 thereof, and the slave unit 102 includes a transmission section 105 and a reception section 106 on a base 112 thereof. The transmission section 103 of the master unit 101 includes an infrared light emitting semiconductor laser (not shown) which emits a transmission light 108 as an infrared communication light, and a visible light emitting diode (not shown) which emits a visible light 107 which has the substantially same emission angle as that of the transmission light 108 and is incoherent with respect to the transmission light 108. The reception section 106 of the slave unit 102 includes a condenser lens (not shown) which converges the transmission light 108, and a light receiving element such as a photodiode or the like which receives the transmission light 108 converged by the condenser lens and converts an optical signal into an electric signal The optical wireless transmission system 100 emits the visible light 107 as well as the transmission light 108 from the master unit 101 toward the slave unit 102, and a user visually inserts the reception section 106 of the slave unit 102 into a range in which the visible light 107 is emitted. Since the emission angle of the visible light 107 is substantially the same as that of the transmission light 108, the slave unit 102 can reliably receive the transmission light.

As described above, according to the conventional optical wireless transmission system 100, the user can recognize a transmission range of the transmission light 108 by looking at the emission range of the visible light 107. Thus, even though the transmission light 108 is emitted in a relatively small range, the optical axis adjustment can be performed, and communication is enabled, with the result that high-rate optical communication is possible with low power consumption.

In the optical wireless transmission system 100, however, a reflection portion need to be provided in the slave unit 102 for the user to look at the visible light 107 emitted from the master unit 101. When holding the slave unit 102 with his or her hand for performing communication, the user needs to look into a reflection portion which is mounted in a direction in which the master unit 101 is located for looking at the visible light 107 emitted to the slave unit 102.

As a solution to the problem, there is a method in which a visible light is emitted from a terminal (e.g. refer to Japanese Laid-Open Patent Publication No. 2005-339025). FIG. 14 is a view for explaining a configuration of a conventional content delivery system 200 disclosed in Japanese Laid-Open Patent Publication No. 2005-339025, FIG. 14(a) shows a configuration of the content delivery system 200, and FIG. 14(b) shows a configuration of a terminal transmitter 203 included in the content delivery system 200. It is noted that although the content delivery system 200 performs high-rate data communication using a extremely-high frequency, since the extremely-high frequency has high directivity (nature of straight travel) similarly to light, in the content delivery system 200, adjustment of an axis of the extremely-high frequency is considered similar to the optical axis adjustment in the optical wireless transmission system.

As shown in FIG. 14(a), the content delivery system 200 includes a terminal transmitter 203 and a portable receiving terminal 202 which includes a reception section 225 and an index laser 229. As shown in FIG. 14(b), the terminal transmitter 203 includes a light guide 215, a transmission section 211, an index sensor 222, and a light 223 for visual confirmation. The light guide 215 restricts a position where the user can look at the light 223 within a reception possible range of the extremely-high frequency transmitted from the terminal transmitter 203.

The user of the content delivery system 200 moves the portable receiving terminal 202 to a position where the user can look at the light 223 without disturbing the light 223 of the terminal transmitter 203 by the light guide 215, and presses an operation button which causes the index laser 229 of the portable receiving terminal 202 to emit a beam, and adjusts the facing direction of the portable receiving terminal 202 to irradiate the terminal transmitter 203 with the beam of the index laser 229. When the index sensor 222 of the terminal transmitter 203 receives the beam of the index laser 229, the transmission section 211 of the terminal transmitter 203 transmits contents (data) to the portable receiving terminal 202 using the extremely-high frequency.

By the configuration and the operation as described thus, the conventional content delivery system 200 can solve the described problems of the conventional optical wireless transmission system 100 (see FIG. 13).

In the conventional content delivery system 200, since the light 223, the index sensor 222, and the transmission section 211 cannot be located at the same position, the positions of the light 223, the index sensor 222, and the transmission section 211 are different from each other (see FIG. 14(b)). Thus, a range in which the index sensor 222 receives the beam of the index laser 229 is appropriately restricted by the light guide 215 to a range (hereinafter, referred to as transmission possible range) in which data can be transmitted from the terminal transmitter 203 to the portable receiving terminal 202. FIG. 15 is a view for explaining a relation between the transmission possible range and a range in which the index sensor 222 can receive the beam of the index laser 229 in the conventional content delivery system 200. As shown in FIG. 15(a), the difference between a transmission possible range 230 and a range 240 in which the index sensor 222 can receive the beam of the index laser 229 occurs so as to generate a region 250 indicated by diagonal lines which is included in the range 240 but not included in the transmission possible range 230. In the case where a beam of a narrow directivity angle is used for data transmission in order to perform data transmission at a higher speed, as shown in FIG. 15(b), the region 250 indicated by the diagonal lines is relatively large in a relation with the transmission possible range 230. In other words, there is a problem that in a relationship between a range (the region 250) in which data communication cannot be performed even though the index sensor 222 receives the laser beam of the index laser 229 of the portable receiving terminal 202 and a range (the transmission possible range 230) in which communication can be performed, the region 250 is relatively larger.

Also, in the conventional content delivery system 200, the terminal transmitter 203 has to include the index sensor 222 and the light 223. This makes a device larger in size and increases manufacturing cost of the device.

SUMMARY OF THE INVENTION

Therefore, an object of the present invention is to provide an optical wireless transmission system for performing high-rate data communication, which can reliably perform optical axis adjustment manually and visually and prevents a device from being made larger in size and manufacturing cost of the device from being increased, and an optical transmitter used in the optical wireless transmission system.

The present invention is directed to an optical wireless transmission system for transmitting data from an optical transmitter to a terminal by means of optical space transmission using an infrared beam. In order to attain the object mentioned above, in the optical wireless transmission system of the present invention, the terminal comprises a visible light transmission section operable to emit a visible beam, and a first light reception section operable to receive the infrared beam. The optical transmitter comprises an incident beam restriction section operable to allow only the visible beam which is emitted by the terminal located within a range in which the infrared beam is emitted and incident thereon to pass therethough, a reflection section operable to reflect the visible beam which has passed through the incident beam restriction section, a second light reception section operable to receive a data transmission request signal from the terminal, and a light source operable to emit the infrared beam to pass through the reflection section after the second light reception section receives the data transmission request signal.

The reflection section may be a half mirror which allows a part of light to pass therethrough, a diffuser panel which diffuses light, or a diffuser panel which allows the infrared beam to pass therethrough and diffuses the visible beam.

The incident beam restriction section may be a lens, a light control film which is capable of setting transmission loss according to an incident angle of light, or an interference filter which is capable of setting transmission loss according to an incident angle of light.

It is preferable that the second light reception section receives as the data transmission request signal a part of the visible beam which is diffused by the diffuser panel.

The present invention is directed to an optical transmitter for performing data transmission to a terminal by means of optical space transmission using an infrared beam. In order to attain the object mentioned above, the optical transmitter of the present invention comprises an incident beam restriction section operable to allow only a visible beam which is emitted by the terminal located within a range in which the infrared beam is emitted and incident thereon to pass therethrough, a reflection section operable to reflect the visible beam which has passed through the incident beam restriction section, and a light source operable to emit the infrared beam to pass through the reflection section according to a data transmission request signal from the terminal.

The reflection section may be a half mirror which allows apart of light to pass therethrough, a diffuser panel which diffuses light, or a diffuser panel which allows the infrared beam to pass therethrough and diffuses the visible beam.

The incident beam restriction section may be a lens, a light control film which is capable of setting transmission loss according to an incident angle of light, or an interference filter which is capable of setting transmission loss according to an incident angle of light.

The optical transmitter further comprises a light reception section operable to receive as the data transmission request signal a part of the visible beam which is diffused by the diffuser pane, and it is preferable that the light source emits the infrared beam to pass through the reflection section according to the data transmission request signal received by the light reception section.

Also, in order to attain the object mentioned above, an optical transmitter of the present invention may comprise an incident beam restriction section operable to allow only a visible beam which is emitted by the terminal located within a range in which an infrared beam is emitted and incident thereon to pass therethrough, a reflection section operable to reflect the visible beam which has passed through the incident beam restriction section, and a light source operable to emit the infrared beam to pass through the reflection section.

According to the above-mentioned present invention, since a transmission possible range of data of the optical transmitter coincides with a range in which the terminal is located when a visible beam is reflected by the optical transmitter, optical axis adjustment can be reliably performed manually and visually. In addition, since an index sensor and a light of visual confirmation are not needed, the optical wireless transmission system is made simpler in structure, a device is prevented from being made larger in size, and manufacturing cost of the device is prevented from being increased.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a view showing an exemplary configuration and a function of an optical transmitter 5b included in an optical wireless transmission system according to a second embodiment of the present invention;

FIG. 5 is a front view of an example of a light control film 11;

DETAILED DESCRIPTION OF THE INVENTION

Figure 1:
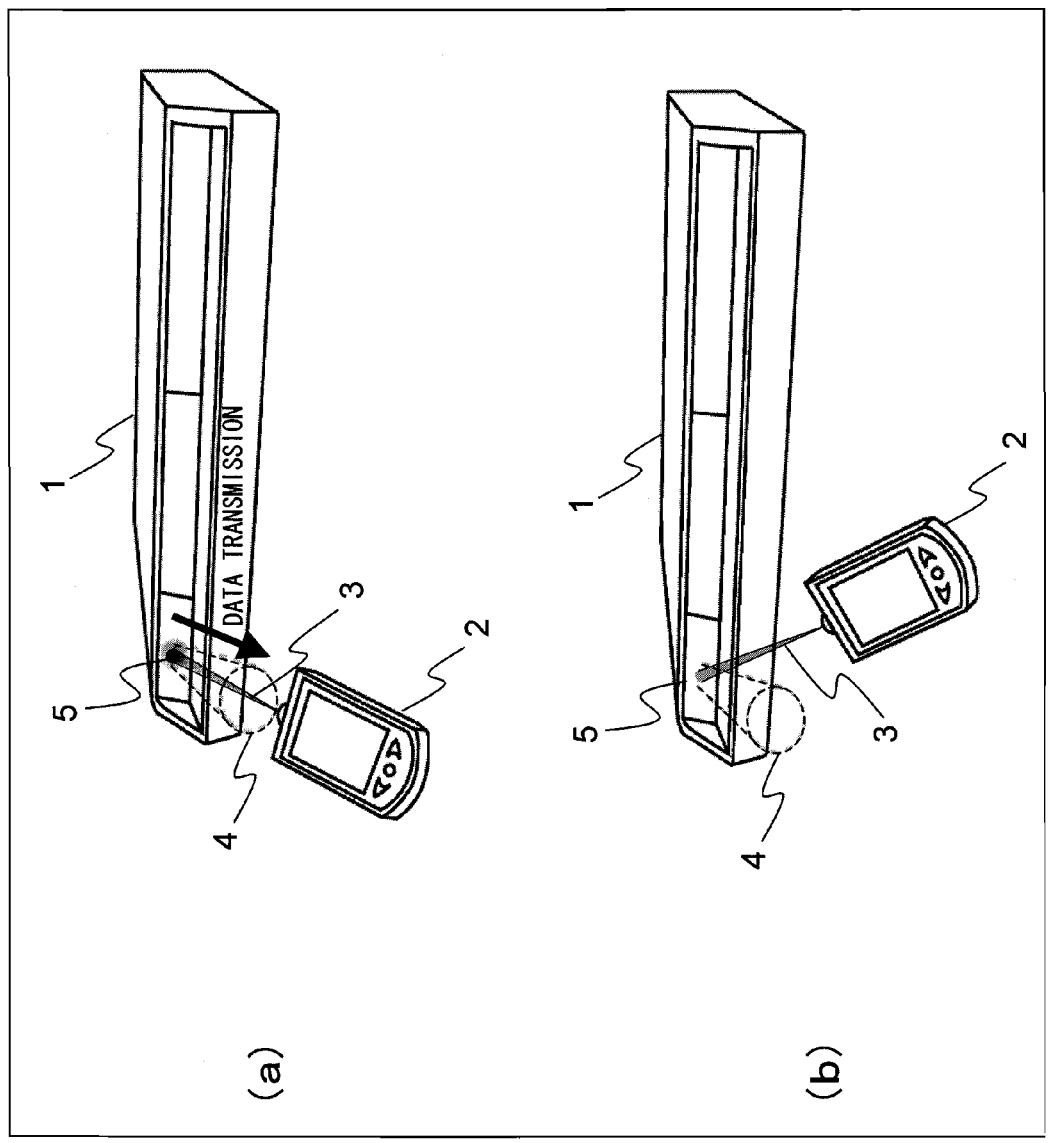
FIG. 1 is a view showing an exemplary entire configuration of an optical wireless transmission system for explaining a basic concept common to all embodiments of the present invention.

The following will describe a basic concept common to all embodiments of the present invention, and then will describe the embodiments in detail. FIG. 1 is a view showing an exemplary entire configuration of an optical wireless transmission system for explaining the basic concept common to all the embodiments of the present invention. As shown in FIG. 1, the optical wireless transmission system of the present invention includes an optical space transmission apparatus 1 such as a content server, and the like, and a terminal 2. It is noted that, for example, the optical space transmission apparatus 1 is a terminal dedicated for delivering music and images, a DVD recorder, a CD player, and the like, and the terminal 2 is a portable device such as a cellular phone, a PDA, and the like which includes a recording region.

As shown in FIG. 1, when a user desires to receive data, the terminal 2 emits a guide light 3 as a visible beam. The user manually moves the terminal 2 or changes the facing direction of the terminal 2 so that the optical transmitter 5 of the optical space transmission apparatus 1 is irradiated with the guide light 3 while looking at the guide light 3. At this time, as shown in FIG. 1(a), when the terminal 2 irradiates the optical transmitter 5 with the guide light 3 from within a range (hereinafter, referred to as a transmission possible range 4) in which data transmission can be performed by an infrared beam which is emitted by the optical transmitter 5 for data transmission, the guide light 3 is reflected by the optical transmitter 5. The user can recognize a state where optical axis adjustment has been performed so that the terminal 2 can receive data by looking at the reflected light. In this case, the optical space transmission apparatus 1 can perform high-rate transmission of data such as contents and the like to the terminal 2 by emitting the infrared beam at a narrow directivity angle from the optical transmitter 5. On the other hand, as shown in FIG. 1(b), when the terminal 2 irradiates the optical transmitter 5 with the guide light 3 from outside the transmission possible range 4, the guide light 3 is not reflected by the optical transmitter 5. In this case, the user can recognize a state where the terminal 2 cannot receive data. Thus, the user manually moves the terminal 2 within the transmission possible range 4 to become a state where the terminal 2 irradiates the optical transmitter 5 with the guide light 3 from within the transmission possible range 4 as shown in FIG. 1(a). This allows the optical space transmission apparatus 1 to perform high-rate transmission of data such as contents and the like to the terminal 2.

It is noted that the guide light 3 is preferably an uneven beam (a beam having a directivity angle) so that it is easy for the user to manually irradiate the optical transmitter 5 and to visually confirm the irradiated position.

Also, in the case where the optical transmitter 5 is irradiated with the guide light 3 from a position which is so distant therefrom that the terminal 2 cannot ensure light reception power which is required for data communication, even though the terminal 2 is located within the transmission possible range 4 (see FIG. 1(a)), a light power and a directivity angle of the guide light 3 are appropriately set to attenuate the light power of the guide light 3 with which the optical transmitter 5 of the optical space transmission apparatus 1 is irradiated, thereby suppressing reflection of the guide light 3 at the optical transmitter 5. In other words, the light power and the directivity angle of the guide light 3 are appropriately set, so that the user cannot look at the light reflected by the optical transmitter 5 of the optical space transmission apparatus 1 in the case where the optical space transmission apparatus 1 and the terminal 2 are too distant from each other to perform data transmission. Therefore, it is preferable that the light power and the directivity angle of the guide light 3 are appropriately set or controlled according to the transmission possible range 4 of the optical transmitter 5, the light power of the infrared beam, and the like.

As described above, in the optical wireless transmission system of the present invention, the user manually moves the terminal 2 or change the facing direction of the terminal 2 while visually recognizing the reflected light of the guide light 3. When the user visually recognizes the right reflected by the optical transmitter 5, the user can confirm that the optical axis adjustment has been completed between the optical space transmission apparatus 1 and the terminal 2 so that data communication is possible. Also, the transmission possible range 4 coincides with a range in which the terminal 2 is located when the guide light 3 is reflected by the optical transmitter 5. Thus, according to the optical wireless transmission system of the present invention, the user can reliably perform the optical axis adjustment manually and visually.

First Embodiment

Figure 2:
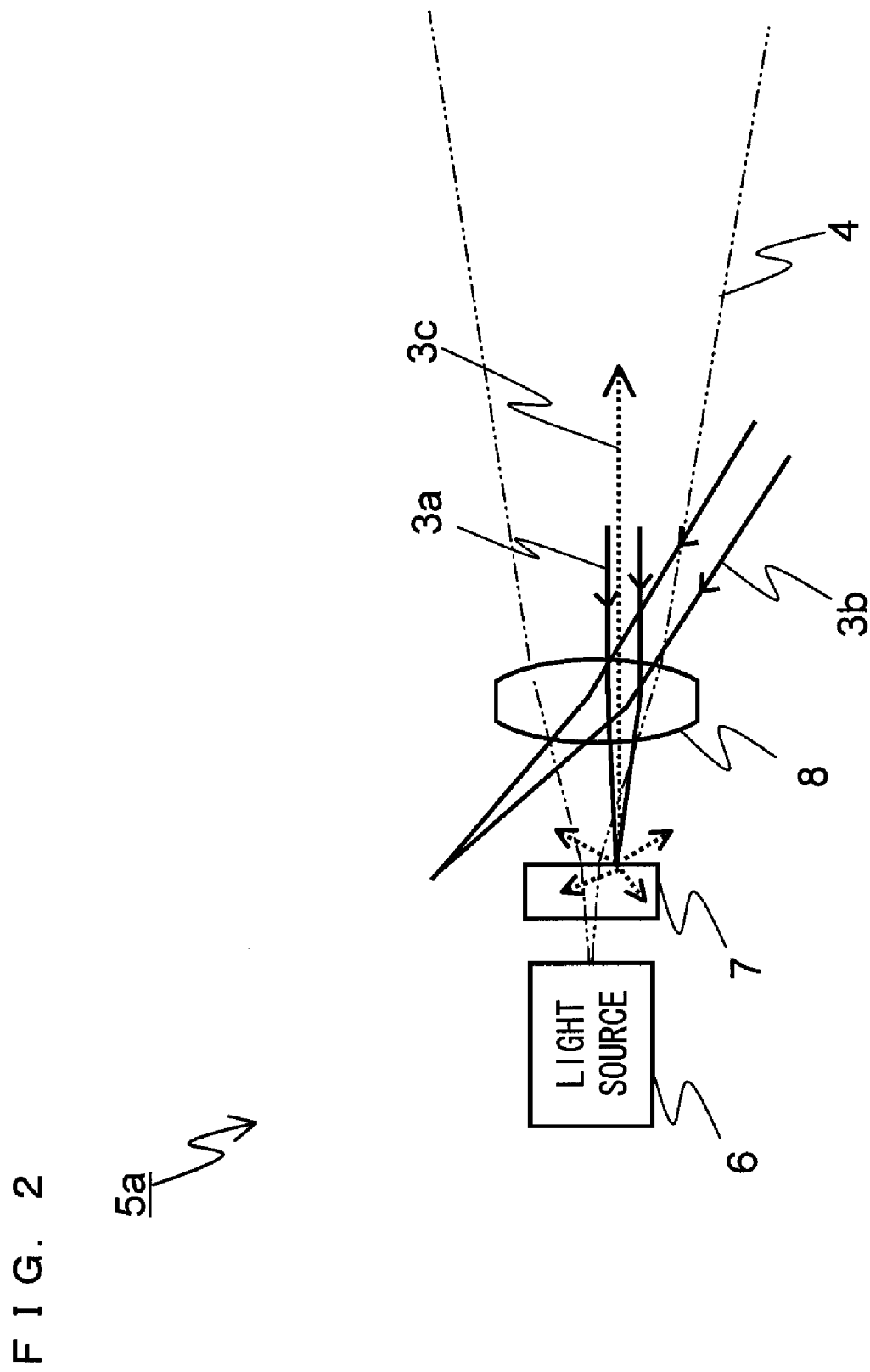
FIG. 2 is a view showing an exemplary configuration and a function of an optical transmitter 5a included in an optical wireless transmission system according to a first embodiment of the present invention.

FIG. 2 is a view showing an exemplary configuration and a function of an optical transmitter 5a included in an optical wireless transmission system according to a first embodiment of the present invention. The following will describe a configuration and a function of the optical transmitter 5a which is a characterizing portion of the first embodiment with reference to FIG. 2. It is noted that although the optical space transmission apparatus 1 includes a hard disc which stores contents and the like, and a system control section which controls data transmission in addition to the optical transmitter 5a, the description thereof will be omitted in the first embodiment.

As shown in FIG. 2, the optical transmitter 5a includes a light source 6, a diffuser panel 7 as a reflection section, and a lens 8 as an incident beam restriction section. The diffuser panel 7 is provided between the light source 6 and the lens 8. A semiconductor laser of excellent high-rate modulation characteristics which emits an infrared beam and, or the like is used as the light source 6.

In the case where the optical transmitter 5a is irradiated with the guide light 3 (see FIG. 1) of the terminal 2 from within the transmission possible range 4 of the optical space transmission apparatus 1 (in this case, the guide light 3 is indicated as a guide light 3a in FIG. 2), the lens 8 converges the guide light 3a into the diffuser panel 7. The diffuser panel 7 diffuses the converged guide light 3a, and emits a diffuse light. Among the diffuse light, a diffuse light 3c is reflected in a direction toward the terminal 2. It is noted that the diffuse light is emitted in any direction, and emitted even in a direction in which the diffuse light passes through the diffuser panel 7 itself. On the other hand, in the case where the optical transmitter 5a is irradiated with the guide light 3 (see FIG. 1) of the terminal 2 from outside the transmission possible range 4 of the optical space transmission apparatus 1 (in this case, the guide light 3 is indicated as a guide light 3b in FIG. 2), the lens 8 does not converge the guide light 3b into the diffuser panel 7. Thus, the diffuser panel 7 does not diffuse the guide light 3, and does not emit a diffuse light. As described thus, the lens 8 as an incident beam restriction section causes only the guide light (the guide light 3a shown in the FIG. 2) which is emitted from the terminal 2 located within the transmission possible range 4 and incident thereon to reach the diffuser panel 7 as a reflection section. As a result, since the diffuse light 3c is emitted only in the case where the optical transmitter 5a is irradiated with the guide light 3 from within the transmission possible range 4, the user can visually confirm the diffuse light 3c to reliably perform the optical axis adjustment.

Figure 3:
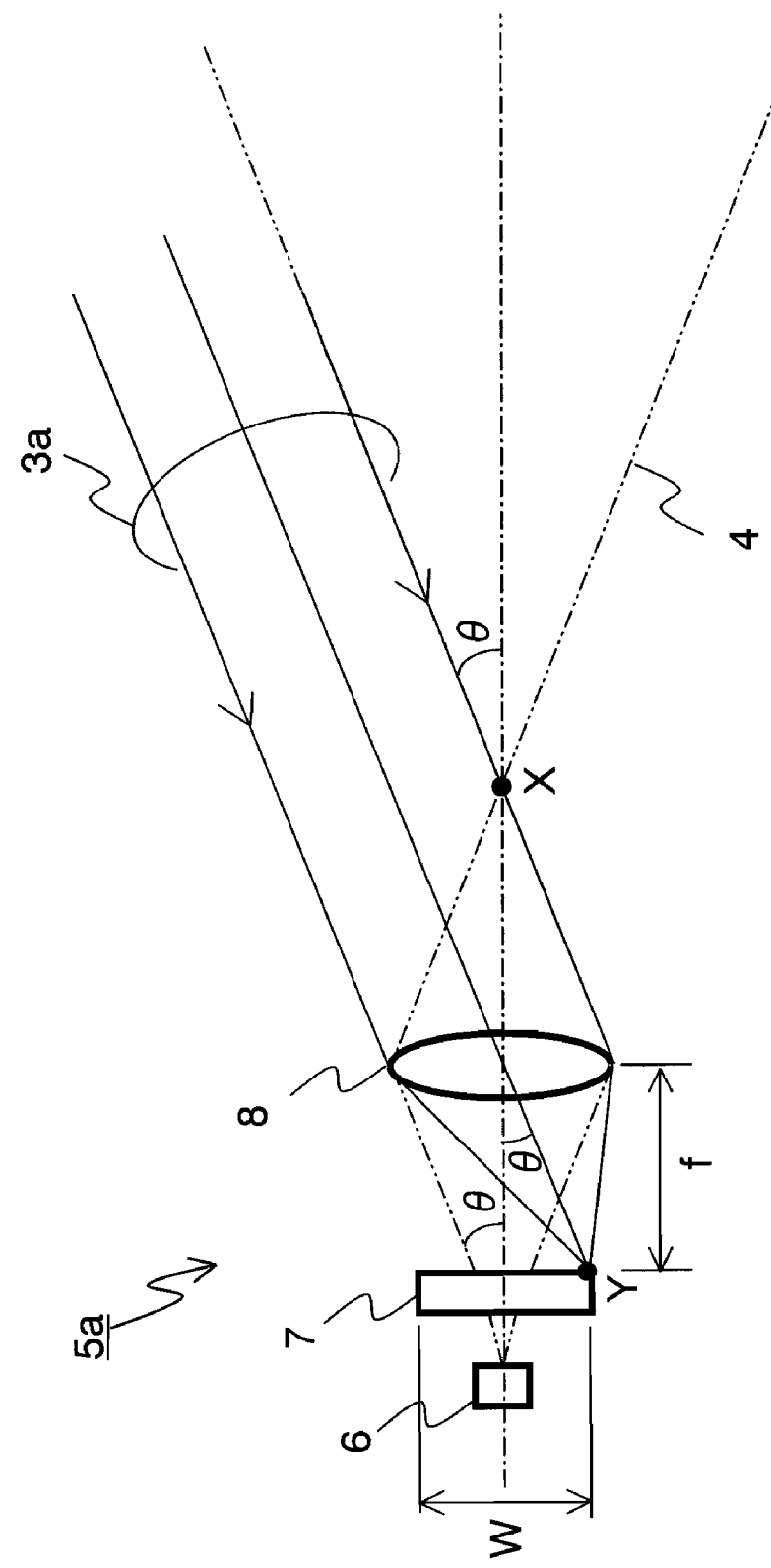
FIG. 3 illustrates a diameter of a diffuser panel 7 of the optical transmitter 5a shown in FIG. 2.

FIG. 3 illustrates a diameter of the diffuser panel 7 of the optical transmitter 5a shown in FIG. 2. In FIG. 3, the same components as those shown in FIG. 2 are designated by the same reference numerals. It is noted that although a focal point X of the lens 8 which exists between the lens 8 and the terminal 2 (not shown) is omitted in FIG. 2 for convenience of explanation, the focal point X is shown in FIG. 3. Thus, the transmission possible range 4 in FIG. 2 is technically different from that in FIG. 3. However, since the distance between the lens 8 and the focal point X is extremely small with respect to the distance between the lens 8 and the terminal 2, the transmission possible range 4 in FIG. 2 can be considered the same as that in FIG. 3.

The following will describe the diameter of the diffuser panel 7 with reference to FIG. 3. The focal point of the lens 8 which is irradiated with the guide light 3a emitted from the terminal 2 (not shown) which is located at the border between the inside and outside of the transmission possible range 4 is denoted by Y. It is noted that in FIG. 3, it is seen that the guide light 3a is emitted from outside the transmission possible range 4 but it is because the optical transmitter 5a is enlarged for convenience of explanation. A directivity angle of a data transmission light (an emission range of the data transmission light coincides with the transmission possible range 4) emitted from the light source 6 which has passed through the diffuser panel 7 is denoted by θ, the distance between the lens 8 and the focal point Y is denoted by f. In this case, as seen from FIG. 3, the diameter W of the diffuser panel 7 is represented as an equation, $W = 2f \tan \theta$.

As described above, the optical wireless transmission system of the first embodiment includes the optical transmitter 5a, thereby reliably performing the optical axis adjustment manually and visually. In addition, the optical wireless transmission system does not need to include an index sensor and a light for visual confirmation. This achieves a simply-constructed optical wireless transmission system, and prevents a device from being made larger in size and manufacturing cost of the device from being increased.

In order not to reflect, at a location other than the diffuser panel 7, the guide light 3 with which the optical transmitter 5a is irradiated, it is preferable that the periphery of the diffuser panel 7 is covered with a black body which absorbs light, or the like. In the case where the diffuser panel 7 is formed in a rectangular shape, a quadrate shape, or the like, and not in a circular shape for convenience of manufacturing, a part of the diffuser panel 7 other than a circular part of the diameter W which equals to $2f \tan \theta$ needs to be covered with a black body or the like. It is preferable that the diffuser panel 7 is made of a light diffusing material which emits a diffuse light of light intensity distribution similar to perfect diffuse reflection (Lambertian) distribution.

Not all the guide light 3 with which the optical transmitter 5a is irradiated is reflected by the diffuser panel 7, and a part of the guide light 3 passes through the diffuser panel 7 to reach the light source 6. However, since the light intensity of the guide light 3 is sufficiently attenuated by the diffuser panel 7, the part of the guide light 3 has a little effect on the light source 6. In the case where the guide light 3 which reaches the light source 6 needs to be attenuated further according to requested specifications of the system, however, a wavelength filter which blocks light having a wavelength of the visible light region may be inserted between the light source 6 and the diffuser panel 7.

In order not to diffuse and attenuate the infrared beam which is emitted by the light source 6 for data transmission when it passes through the diffuser panel 7, the diffuser panel 7 may have characteristics to diffuse only a part of visible light and allow the part of visible light to pass therethrough while allowing infrared light to pass therethrough without diffusing it.

Second Embodiment

FIG. 4 is a view showing an exemplary configuration and a function of an optical transmitter 5b included in an optical wireless transmission system according to a second embodiment of the present invention. As shown in FIG. 4, the optical transmitter 5b is configured so that the lens 8 as an incident beam restriction section of the optical transmitter 5a (see FIG. 2) described in the first embodiment is replaced with a light control film 11 which is capable of setting transmission loss according to an incident angle of light. It is noted that hereinafter, the same components as those of the optical transmitter 5a of the first embodiment are designated by the same reference numerals, and the detailed description thereof will be omitted.

FIG. 5 is a front view of an example of the light control film 11. As shown in FIGS. 4 and 5, the light control film 11 includes a thin plate, and concentric circular grooves which are formed on the thin plate, and has characteristics to allow only a light beam which is incident thereon from a predetermined direction to pass therethrough while blocking the other light beam. A center of the light control film 11 (a center of the concentric circular grooves) is located on a central axis of the beam which is emitted by the light source 6 for data transmission.

In the case where the optical transmitter 5b is irradiated with the guide light 3 (see FIG. 1) of the terminal 2 from within the transmission possible range 4 (in this case, the guide light 3 is indicated as a guide light 3a in FIG. 4), the light control film 11 allows the guide light 3a to pass therethrough. The diffuser panel 7 diffuses the guide light 3a which has passed through the light control film 11, and emits a diffuse light. Among the diffuse light, a diffuse light 3c is reflected in a direction toward the terminal 2. On the other hand, in the case where the optical transmitter 5b is irradiated with the guide light 3 (see FIG. 1) of the terminal 2 from outside the transmission possible range 4 (in this case, the guide light 3 is indicated as a guide light 3b in FIG. 4), the light control film 11 does not allow the guide light 3b to pass therethrough. Thus, the diffuser panel 7 dose not diffuse the guide light 3b, and does not emit a diffuse light. As described thus, since the diffuse light 3c is emitted only in the case where the optical transmitter 5b is irradiated with the guide light 3 from within the transmission possible range 4, the user can reliably perform the optical axis adjustment visually.

Characteristics of a transmission angle of the light control film is determined by a pitch L and a height H of the grooves, and an angle for which the light control film allows transmission ranges from a vertical angle to $\tan^{-1}(L/H)$ with respect to the surface of the light control film. Thus, it is preferable that a light control film which has characteristics of the transmission angle according to the transmission possible range 4 is used as the light control film 11.

As described above, the optical wireless transmission system of the second embodiment includes the optical transmitter 5b, thereby obtaining the same advantageous effects as the optical wireless transmission system of the first embodiment. In addition, the light control film 11 is used as an incident beam restriction section, so that the diffuser panel 7 and the light control film 11 can be closely located unlike the optical wireless transmission system of the first embodiment which needs a focal distance for using the lens 8. Thus, a device is made smaller in size.

Third Embodiment

Figure 6:
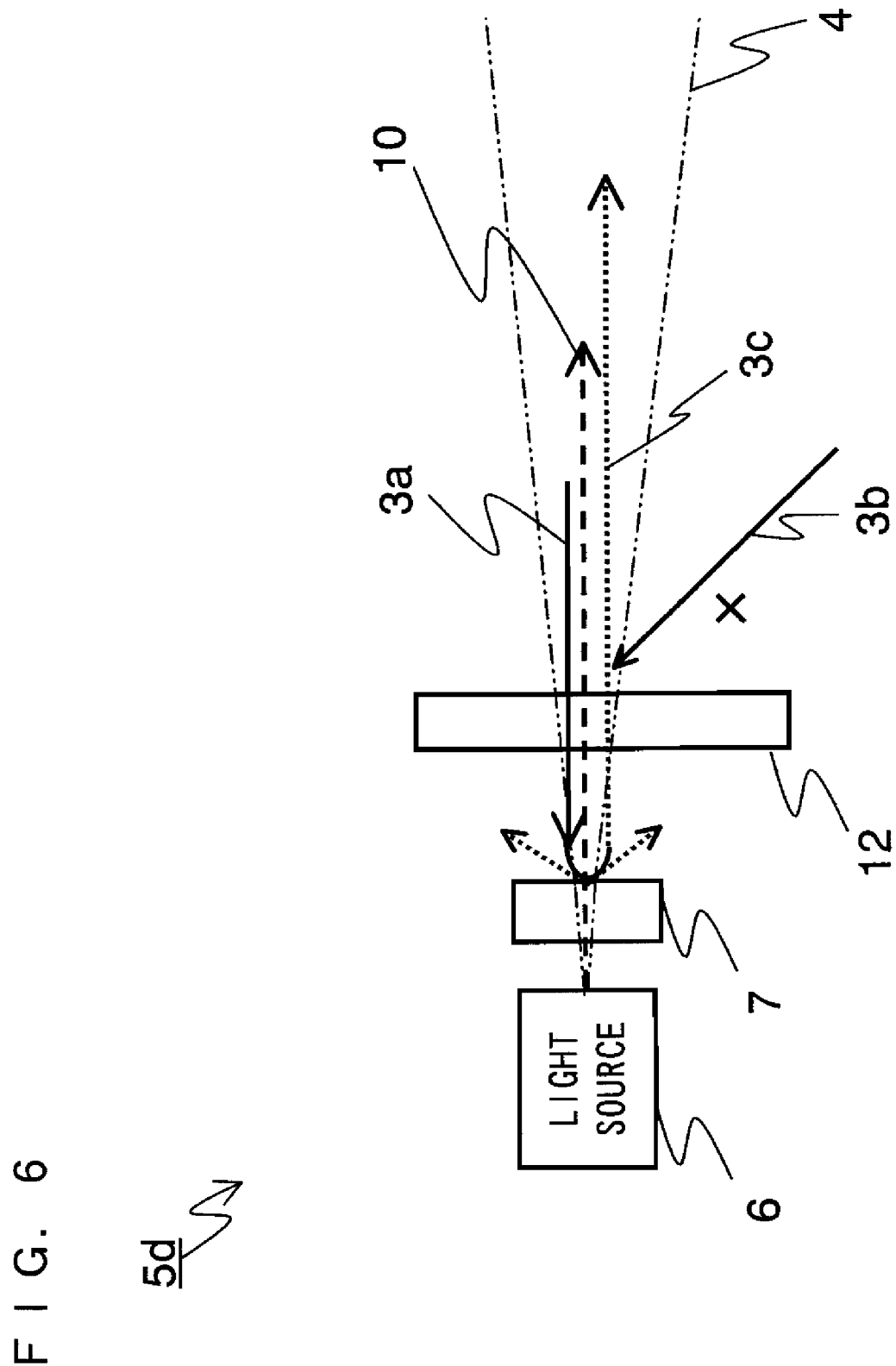
FIG. 6 is a view showing an exemplary configuration and a function of an optical transmitter 5d included in an optical wireless transmission system according to a third embodiment of the present invention.

FIG. 6 is a view showing an exemplary configuration and a function of an optical transmitter 5d included in an optical wireless transmission system according to a third embodiment of the present invention. As shown in FIG. 6, the optical transmitter 5d is configured so that the lens 8 of the optical transmitter 5a (see FIG. 2) described in the first embodiment is replaced with an interference filter 12 which is capable of setting transmission loss according to an incident angle of light. It is noted that hereinafter, the same components as those of the optical transmitter 5a of the first embodiment are designated by the same reference numerals, and the detailed description thereof will be omitted.

As the interference filter 12, a wavelength filter which is formed by a common dielectric multilayer film is used. In the wavelength filter, where a transmission wavelength (a reference wavelength) of a normal incident light is denoted by $\lambda_0$, a transmission wavelength $\lambda$ of an incident angle a is represented as an equation, $\lambda = \cos a \lambda_0$ (e.g. refer to P167 of "optical pencil" written by Tadao Tsuruta, published by New Technology Communication on Jun. 20, 1989, the seventh printing). Thus, the wavelength filter which allows the light of the wavelength $\lambda$ incident at the incident angle a to pass therethrough with a minimum loss increases transmission loss of a light of the wavelength $\lambda$ which is incident at an incident angle different from the incident angle a. The light of the wavelength $\lambda$ having large transmission loss is reflected by specular reflection by the wavelength filter according to an amount of transmission loss. Since the light (the guide light 3) of the wavelength $\lambda$ reflected by specular reflection does not return in a direction in which the light of the wavelength $\lambda$ is emitted (a direction toward the terminal 2), the light of the wavelength $\lambda$ is not visually confirmed by the user. Therefore, for example, as shown in FIG. 6, characteristics of transmission loss of the interference filter 12 is designed so that transmission loss becomes minimum when the guide light 3a is incident normally and so that a range in which the terminal 2 is located when the guide light 3a is not reflected by specular reflection and passes through the interference filter 12 coincides with the transmission possible range 4.

In addition, in the interference filter 12, characteristics of transmission loss may be set according to a wavelength of a light beam while characteristics of transmission loss is set according to an incident angle of the guide light as described above. For example, the interference filter 12 is designed so that a transmission light 10 which is emitted by the light source 6 for data transmission and the guide light 3 have the same transmission characteristics in wavelength, thereby irradiating the terminal 2 with the transmission light 10 at low transmission loss.

As described above, the optical wireless transmission system of the third embodiment includes the optical transmitter 5d which uses the interference filter 12 as an incident beam restriction section, thereby obtaining the same advantageous effects as the optical wireless transmission system of the second embodiment.

It is noted that although the diffuser panel 7 is used as a reflection section in the optical transmitter included in the optical wireless transmission system of the first to third embodiments, a half mirror which allows a part of an incident light to pass therethrough may be used instead of the diffuser panel 7 in the optical wireless transmission system of the first to third embodiments.

Figure 7:
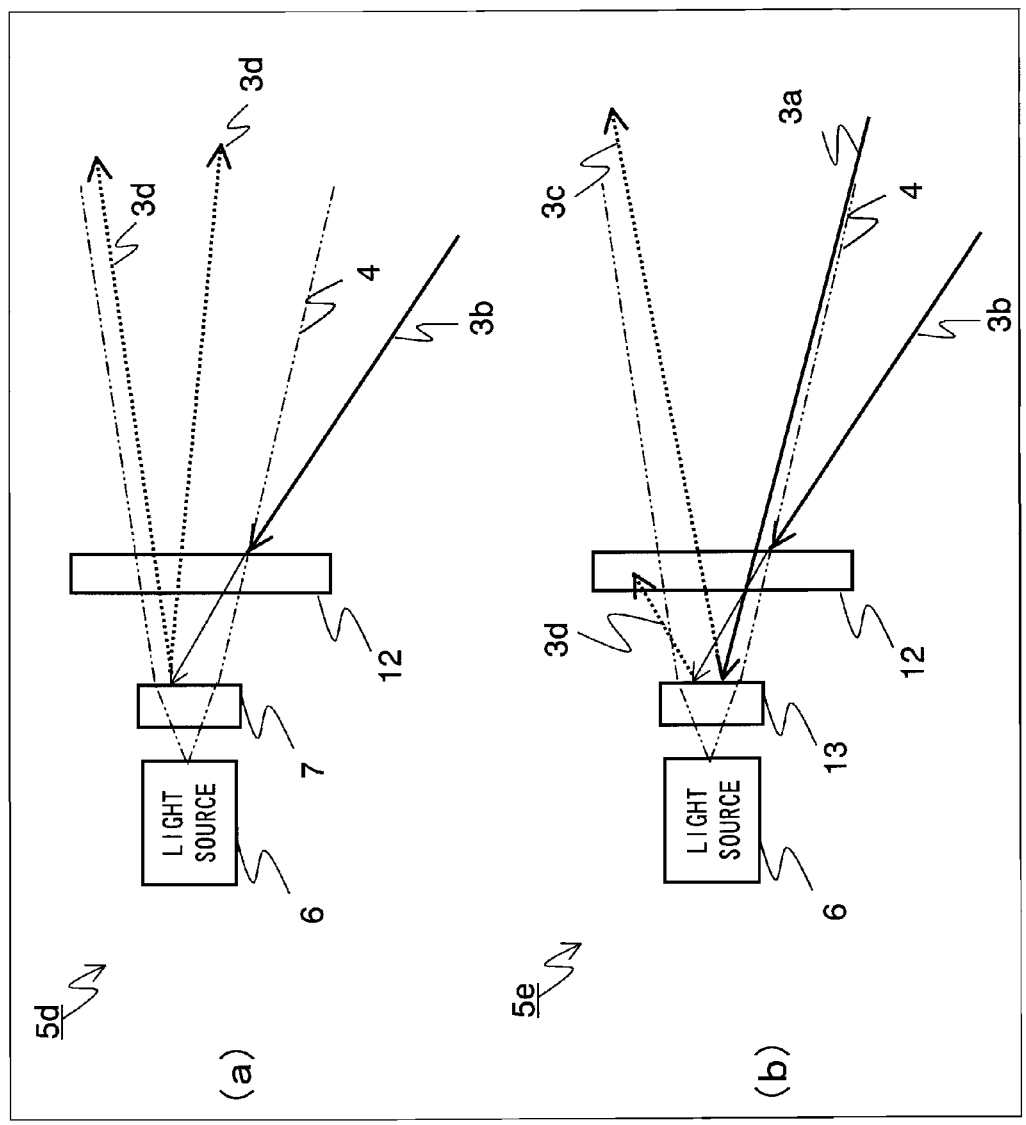
FIG. 7 is a view for explaining an exemplary configuration and a function in the case where a half mirror 13 is used instead of the diffuser panel 7 in the optical transmitter 5d included in the optical wireless transmission system according to the third embodiment.

The following will describe as an example a case where a half mirror is used instead of the diffuser panel 7 of the optical transmitter 5d included in the optical wireless transmission system of the third embodiment. FIG. 7 is a view for explaining an exemplary configuration and a function in the case where a half mirror 13 is used instead of the diffuser panel 7 in the optical transmitter 5d included in the optical wireless transmission system according to the third embodiment. FIG. 7(a) shows the optical transmitter 5d including the diffuser panel 7, and FIG. 7(b) shows an optical transmitter 5e including the half mirror 13 instead of the diffuser panel 7.

In the optical transmitter 5d shown in FIG. 7(a), when the guide light 3 (indicated as a guide light 3b in FIG. 7(a)) is emitted from outside the transmission possible range 4, the guide light 3b is ideally totally reflected by the interference filter 12, and does not reach the diffuser panel 7. However, the guide light 3b may not be totally reflected due to problems of performance of the interference filter 12, and the like, and a part of the guide light 3b may pass through the interference filter 12. Once the part of the guide light 3b passes through the interference filter 12 to reach the diffuser panel 7, the part of the guide light 3b reflected (diffused) by the diffuser panel 7, then passes through the interference filter 12 again to be emitted as a diffuse reflected light 3d of a wide directivity angle. In this case, even when the terminal 2 is not located within the transmission possible range 4, there is a possibility that the user recognizes that there is a reflected light from the optical transmitter 5d, and there is a case where optical axis adjustment cannot be accurately performed. It is noted that in the case where the diffuser panel 7 is used, even when the light source 6 having strong emission power is used, conditions of eye safety (safety with respect to eye) become easy.

In the optical transmitter 5e shown in FIG. 7(b), on the other hand, when the guide light 3 (indicated as a guide light 3b in FIG. 7(b)) is emitted from outside the transmission possible range 4 and a part of the guide light 3b passes through the interference filter 12 to reach the half mirror 13, the guide light 3b is reflected at the same angle as the incident angle according to law of reflection. Since the reflected light 3d is incident on the interference filter 12 again at the same angle as an angle at which the guide light 3b is incident on the interference filter 12, the reflected light 3d is substantially attenuated. As a result, when the terminal 2 is not located within the transmission possible range 4, a possibility that the user recognizes that there is a reflected light from the optical transmitter 5e is reduced, and the optical axis adjustment can be performed more accurately. It is noted that in the case where the half mirror 13 is used, since transmission loss is reduced, data transmission can be performed with weaker emission power of the light source 6.

Fourth Embodiment

Figure 8:
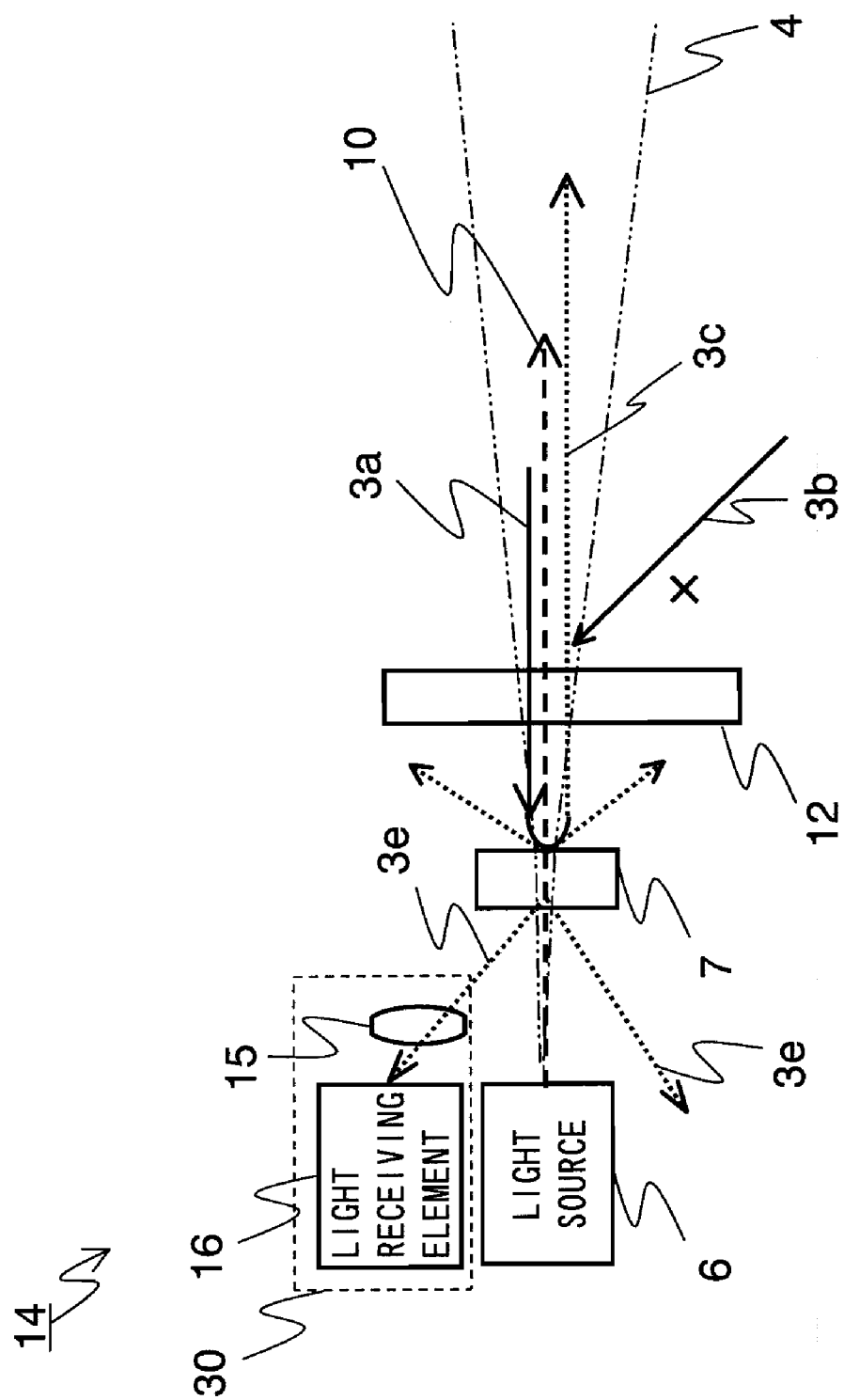
FIG. 8 is a view showing an exemplary configuration and a function of an optical transmitter 14 included in an optical wireless transmission system according to a fourth embodiment of the present invention.

FIG. 8 is a view showing an exemplary configuration and a function of an optical transmitter 14 included in an optical wireless transmission system according to a fourth embodiment of the present invention. As shown in FIG. 8, the optical transmitter 14 is configured so that a light reception section 30 including a lens 15 and a light receiving element 16 is added to the optical transmitter 5d (see FIG. 6) described in the third embodiment. The light receiving element 16 is provided adjacent to the light source 6, and the lens 15 is provided between the light receiving element 16 and the diffuser panel 7. Instead of the interference filter 12, the lens 8 (see FIG. 2) described in the first embodiment or the light control film 11 (see FIG. 4) described in the second embodiment may be used. It is noted that hereinafter, the same components as those of the optical transmitter 5d of the third embodiment are designated by the same reference numerals, and the detailed description thereof will be omitted.

When the guide light 3 (indicated as a guide light 3a in FIG. 8) of the terminal 2 is emitted from within the transmission possible range 4, the guide light 3a passes through the interference filter 12 to reach the diffuser panel 7. The guide light 3a which has reached the diffuser panel 7 is reflected by the diffuser panel 7, and can be looked at as a diffuse light 3c by the user. At the same time, the guide light 3a passes through the diffuser panel 7 to reach as a diffuse light 3e the light receiving element 16 adjacent to the light source 6 through the lens 15. Then, the light receiving element 16 receives the diffuse light 3e converged by the lens 15. It is noted that when the light receiving element 16 ensures sufficient light reception power, the light reception section 30 may not include the lens 15.

Therefore, the optical space transmission apparatus 1 including the optical transmitter 14 can determine that the terminal 2 emits the guide light 3 from within the transmission possible range 4. In other words, the optical space transmission apparatus 1 can determine that the optical axis adjustment between the terminal 2 and the optical space transmission apparatus 1 has been completed so that data communication is possible. Then, the optical space transmission apparatus 1 can determine whether or not to start data transmission to the terminal 2 according to whether or not there is the above determination. In addition, the terminal 2 can transmit an information signal such as a control signal, and the like to the optical space transmission apparatus 1 using the guide light 3.

Figure 9:
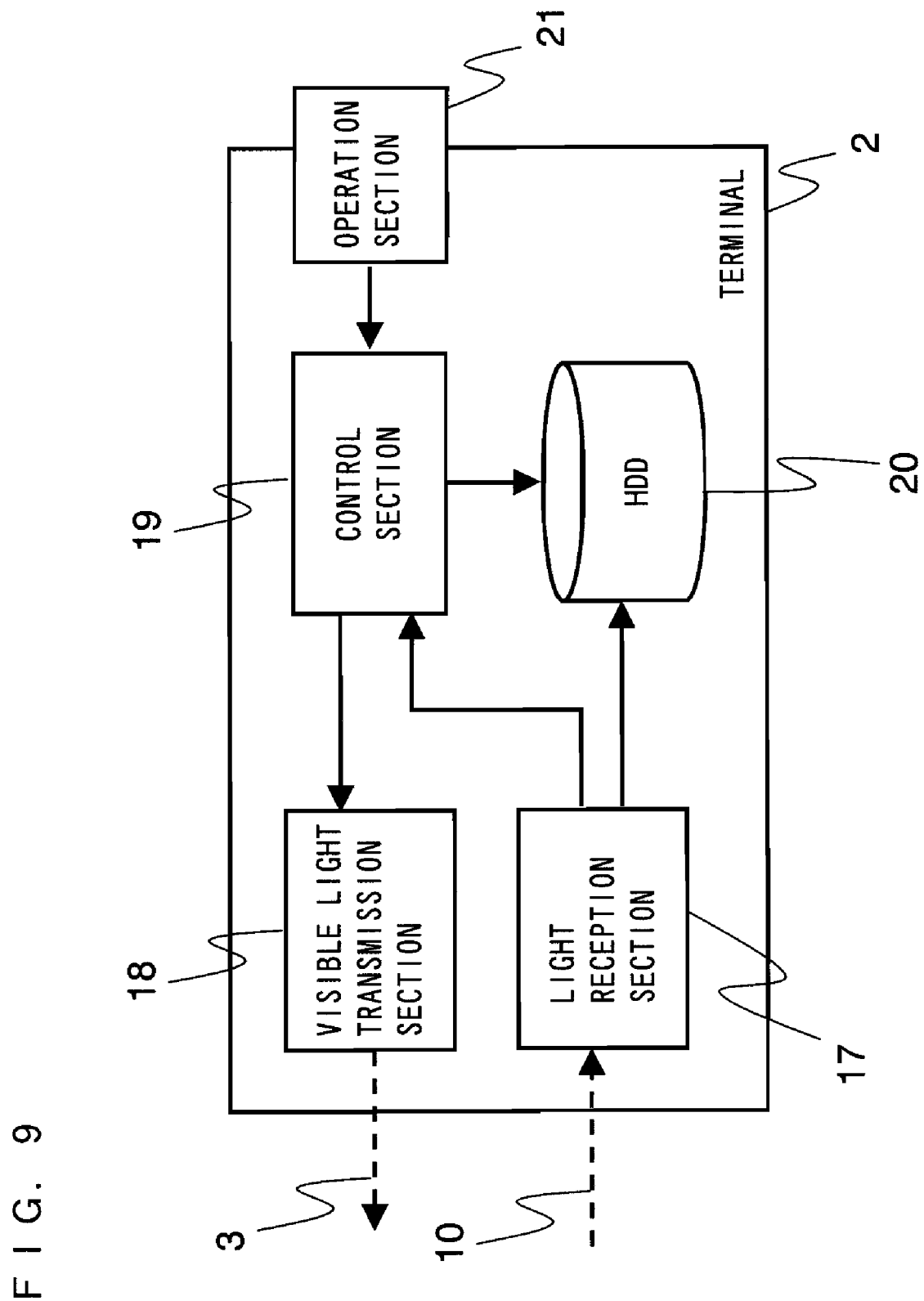
FIG. 9 is a view showing an exemplary configuration of a terminal 2 included in the optical wireless transmission system according to the fourth embodiment.
Figure 10:
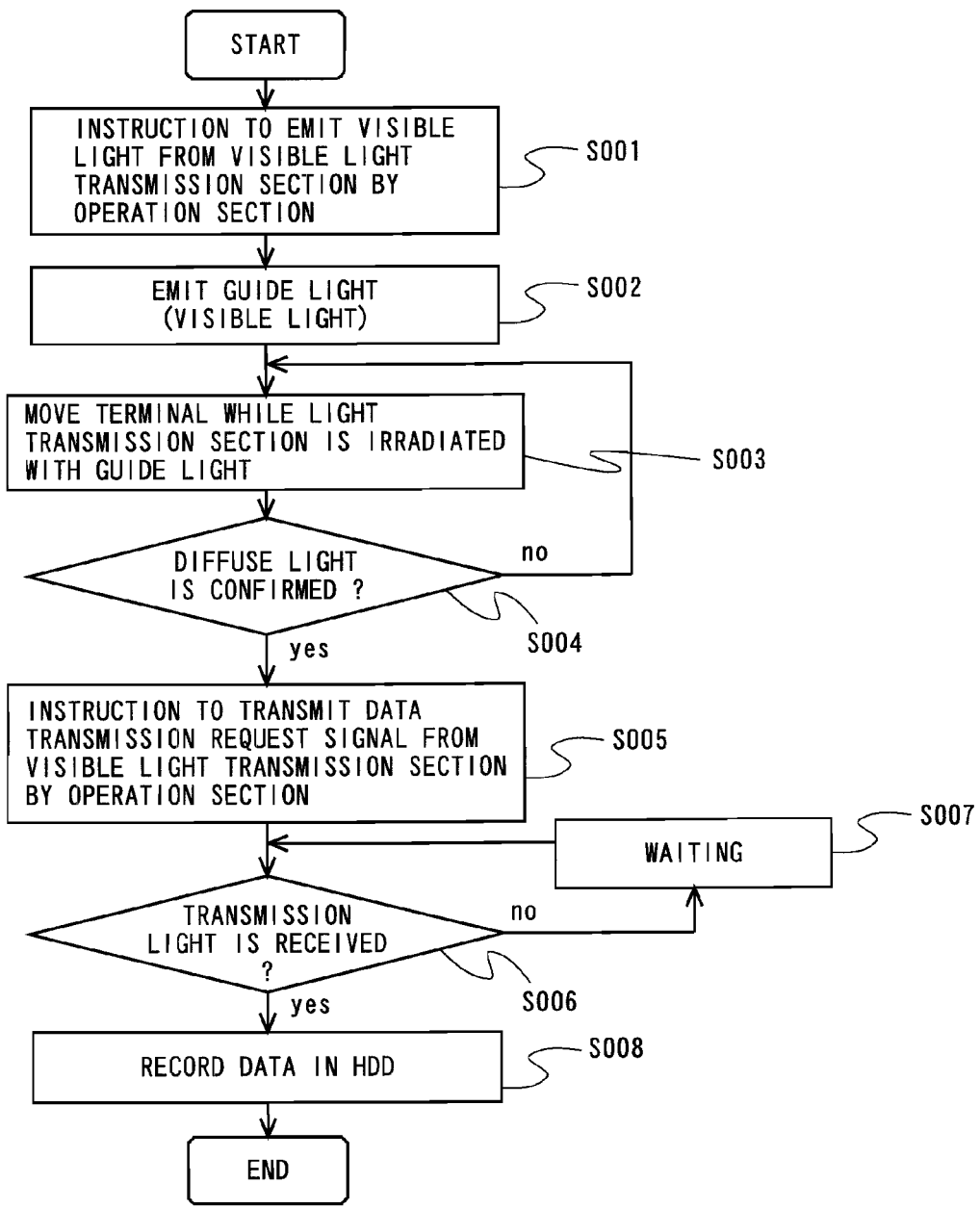
FIG. 10 is a flow chart showing an operation procedure of the terminal 2 in transmitting data such as contents and the like from an optical space transmission apparatus 1 to the terminal 2 in the fourth embodiment.
Figure 11:
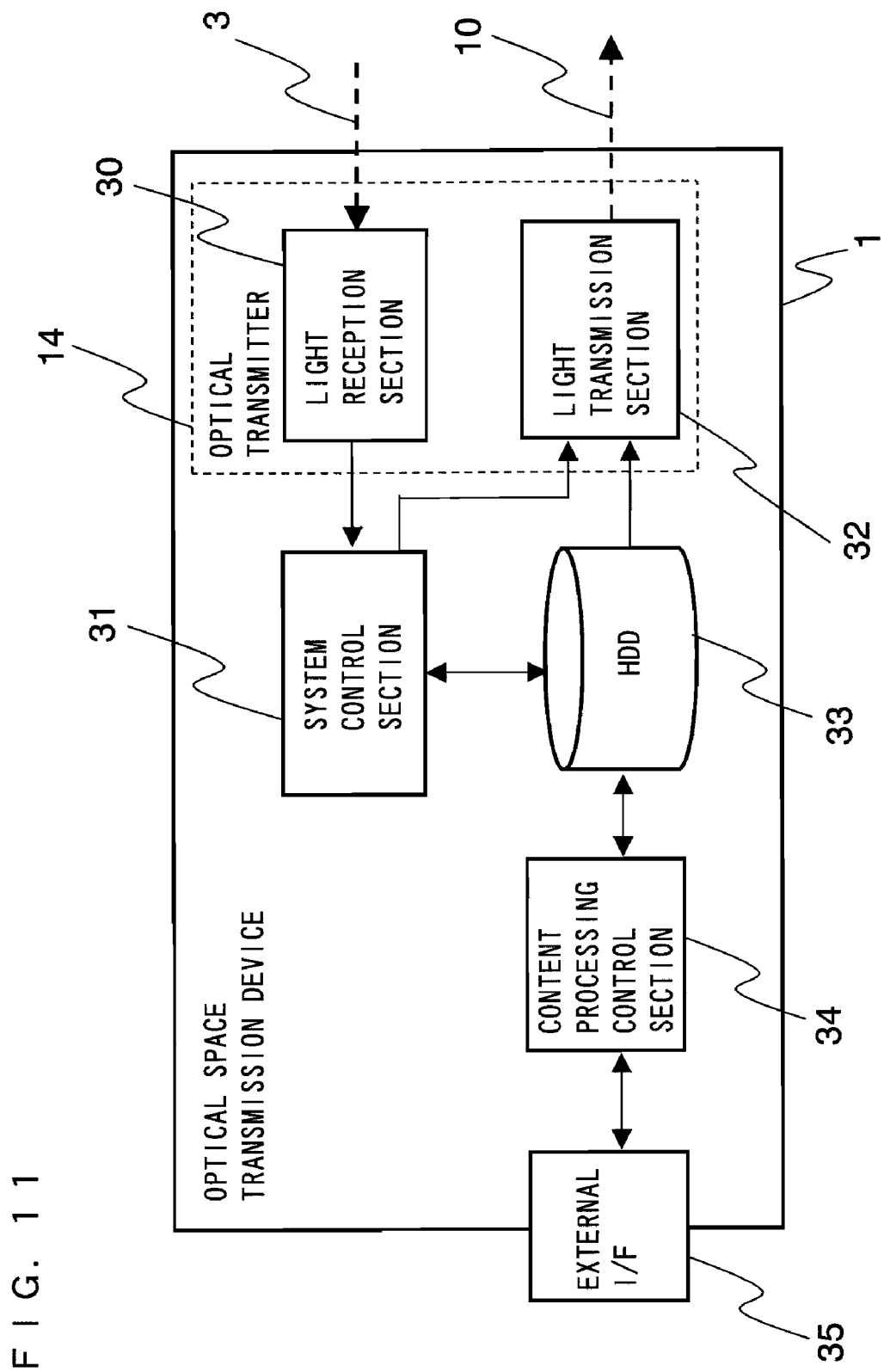
FIG. 11 is a view showing an exemplary configuration of the optical space transmission apparatus 1 included in the optical wireless transmission system according to the fourth embodiment.
Figure 12:
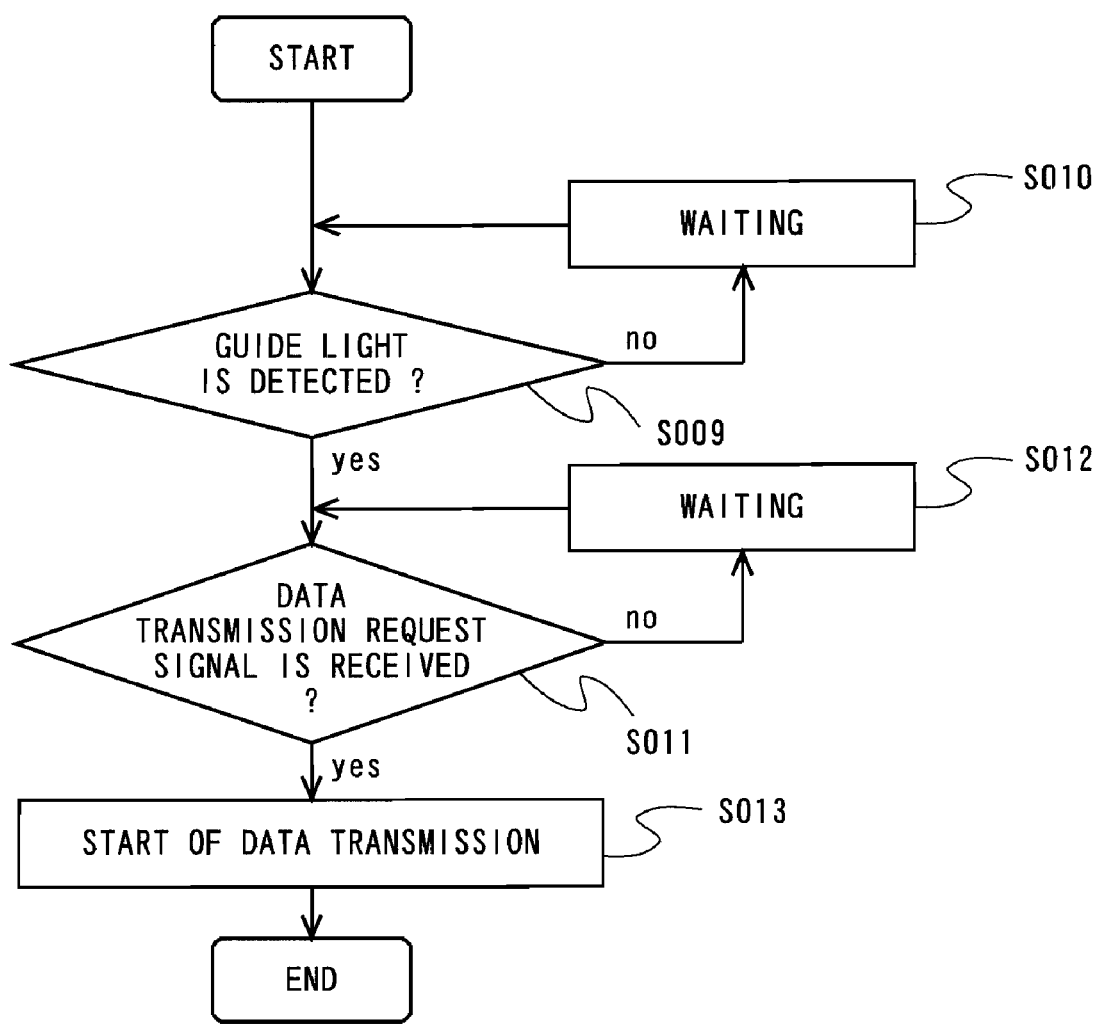
FIG. 12 is a flow chart showing an operation of the optical space transmission apparatus 1 in transmitting data such as contents and the like from the optical space transmission apparatus 1 to the terminal 2.
Figure 13:
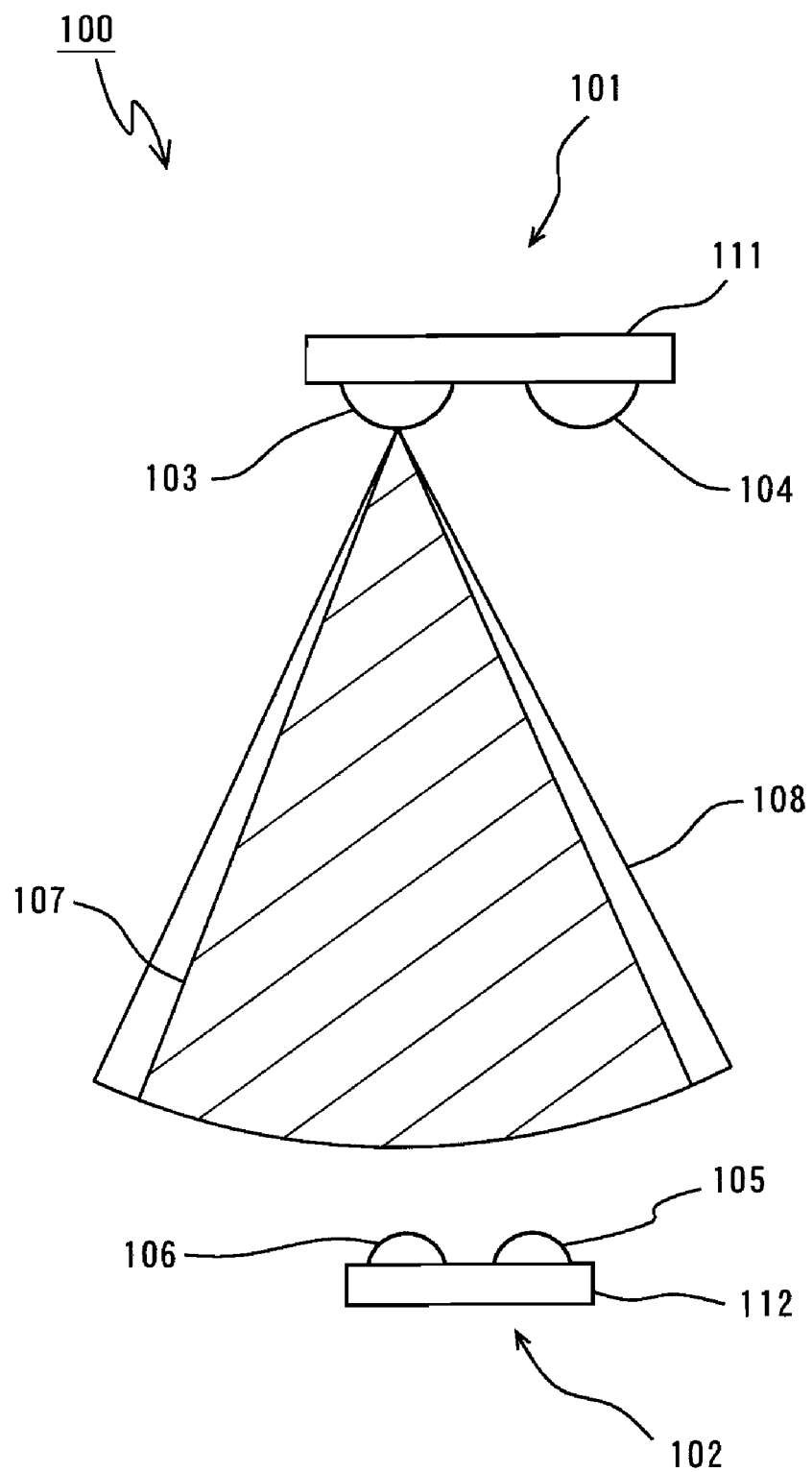
FIG. 13 is a view showing a configuration of a conventional optical wireless transmission system 100 disclosed in Japanese Laid-Open Patent Publication No. 2005-101853.
Figure 14:
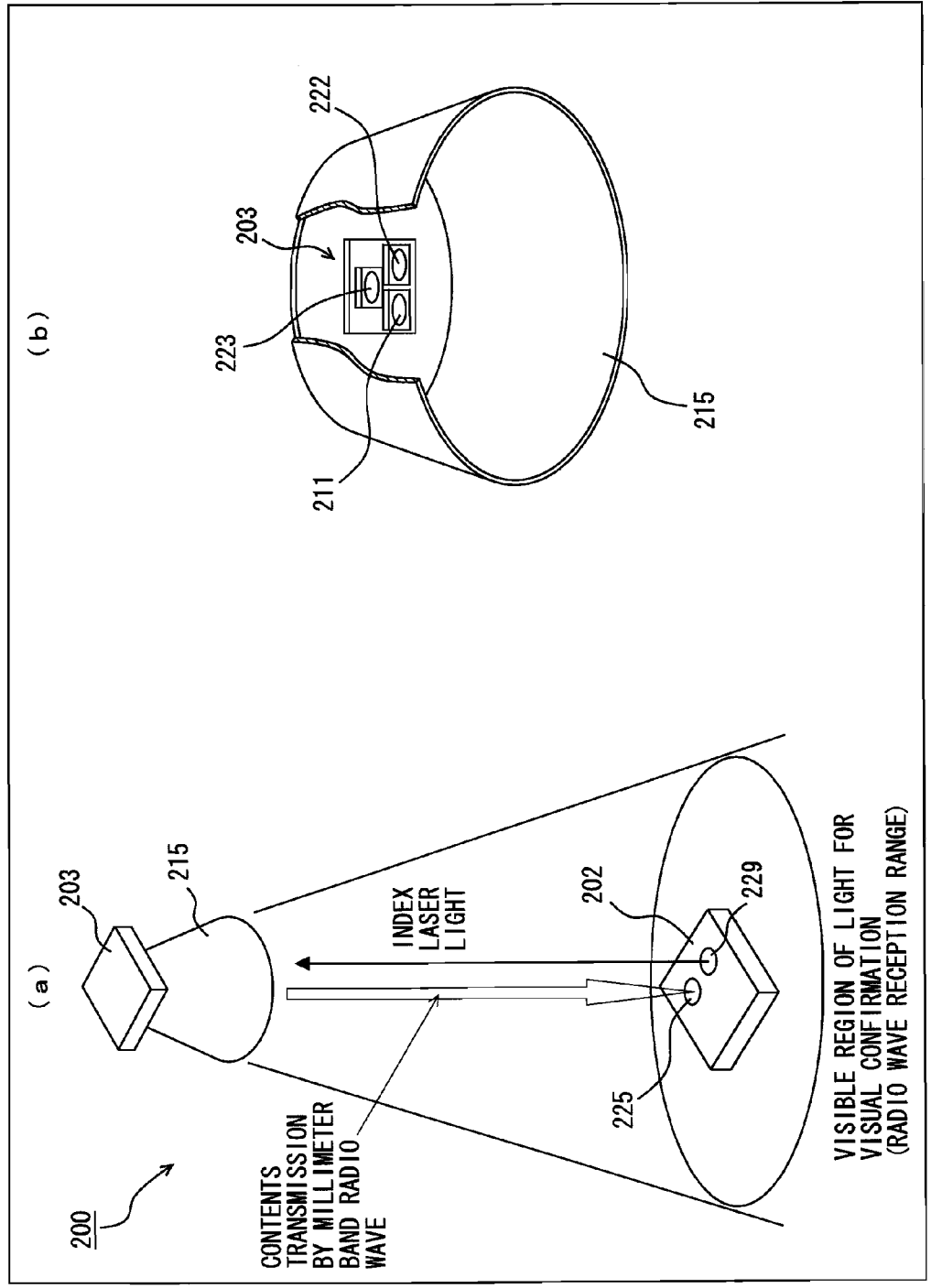
FIG. 14 is a view for explaining a configuration of a conventional content delivery system 200 disclosed in Japanese Laid-Open Patent Publication No. 2005-339025.
Figure 15:
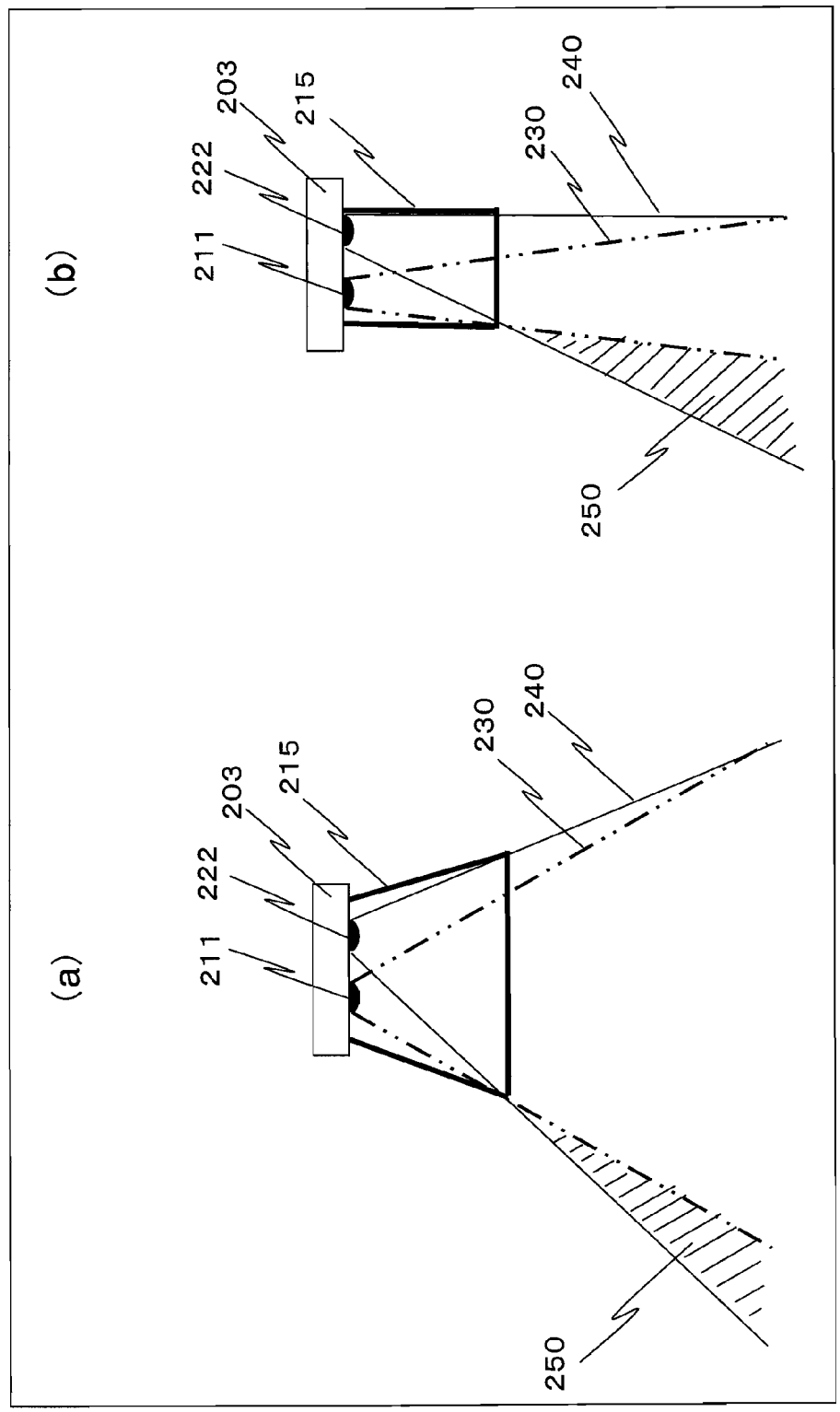
FIG. 15 shows a relation between a transmission possible range and a range in which a index sensor 222 can receive a beam of an index laser 229 in the conventional content delivery system 200.

FIG. 9 is a view showing an exemplary configuration of the terminal 2 included in the optical wireless transmission system according to the fourth embodiment of the present invention. FIG. 10 is a flow chart showing an operation procedure of the terminal 2 in transmitting data such as contents and the like from the optical space transmission apparatus 1 to the terminal 2 in the fourth embodiment. FIG. 11 is a view showing an exemplary configuration of the optical space transmission apparatus 1 included in the optical wireless transmission system according to the fourth embodiment of the present invention. FIG. 12 is a flow chart showing an operation of the optical space transmission apparatus 1 in transmitting data such as contents and the like from the optical space transmission apparatus 1 to the terminal 2. With reference to FIGS. 9 to 12, the following will describe a configuration and a function of the terminal 2 and the optical space transmission apparatus 1, and an operation in transmitting data from the optical space transmission apparatus 1 to the terminal 2.

As shown in FIG. 9, the terminal 2 includes a light reception section 17, a visible light transmission section 18, a control section 19, a hard disc (HDD) 20, and an operation section 21. As shown in FIG. 10, when the user desires to download data from the optical space transmission apparatus 1 to the terminal 2, the user operates the operation section 21 to give an instruction to emit the guide light 3 (step S001). Next, the control section 19 receives from the operation section 21 the instruction to emit the guide light 3, and causes the visible light transmission section 18 to emit the guide light 3 (step S002). Next, the user irradiates the optical transmitter 14 of the optical space transmission apparatus 1 with the emitted guide light 3 while visually confirming the emitted guide light 3, and moves the position of the terminal 2 until confirming a diffuse light (a reflected light) from the optical transmitter 14 (step S003). Next, after the user confirms the diffuse light (step S004), the user operates the operation section 21 to give an instruction to transmit a data transmission request signal to the optical space transmission apparatus 1. Next, the control section 19 receives from the operation section 21 the instruction to transmit the data transmission request signal, and causes the visible light transmission section 18 to emit the guide light 3 which is modulated by the data transmission request signal thereby transmit the data transmission request signal to the optical space transmission apparatus 1 (step S005).

As shown in FIG. 11, on the other hand, the optical space transmission apparatus 1 includes an optical transmitter 14, a system control section 31, a hard disc (HDD) 33, a content processing control section 34, and an external interface 35. The optical transmitter 14 includes the light reception section 30 which includes the light receiving element 16 and the lens 15, and a light transmission section 32 which includes the light source 6, the diffuser panel 7, and the interference filter 12 (see FIG. 7). It is noted that the light transmission section 32 may include the lens 8 or the light control film 11 instead of the interference filter 12 (see FIGS. 2 and 4). As shown in FIG. 12, in the optical space transmission apparatus 1, after the light reception section 30 waits until detecting the guide light 3 of the terminal 2 (step S010), the light reception section 30 detects the guide light 3 (step S009). Next, after the light reception section 30 waits until receiving the data transmission request signal transmitted from the terminal 2 (step S012), the light reception section 30 receives the data transmission request signal (step S011), and outputs the data transmission request signal to the system control section 31. Next, the system control section 31 controls the hard disc 33, and causes content data to be outputted from the hard disc 33 to the light transmission section 32. At the same time, the system control section 31 controls the light transmission section 32 to emit a transmission light 10 including the content data, thereby transmitting the content data to the terminal 2 (step S013). It is noted that the hard disc 33 has already accumulated the content data from the outside through the content processing control section 34 which is connected to the external interface 35.

As shown in FIG. 10, after the terminal 2 waits until receiving at the light reception section 17 the transmission light 10 emitted from the optical space transmission apparatus 1 (step S007), the terminal 2 receives the transmission light 10 (step S006). Next, the light reception section 17 transmits to the control section 19 information which indicates receipt of the transmission light 10, and transmits the content data included in the transmission light 10 to the hard disc 20. Next, the control section 19 causes the hard disc 20 to record the transmitted content data (step S008).

As described above, the optical wireless transmission system according to the fourth embodiment includes the optical transmitter 14. Thus, the same advantageous effects as the optical wireless transmission system according to the first to third embodiments are obtained. In addition, after confirming that the optical axis adjustment has been completed, the user can transmit desired data such as contents, and the like from the optical space transmission apparatus 1 to the terminal 2 by operating the terminal 2.

In the above description, the user transmits the data transmission signal from the terminal 2 (step S005 in FIG. 10) after completion of the optical axis adjustment (after the user confirms the diffuse light of the guide light 3). However, the guide light 3 emitted at the step S002 in FIG. 10 may include a data transmission request signal, and may be transmitted from the terminal 2. In this case, the step S005 in FIG. 10, and the step S012 in FIG. 12 are omitted, and operations of the step S009 in FIG. 12 and the step S011 in FIG. 12 are included. The light reception section 30 of the optical space transmission apparatus 1 may receive the non-modulated guide light 3 itself as a data transmission request signal. In this case, the step S005 in FIG. 10, the step S011 in FIG. 12, and the step S012 in FIG. 12 are omitted.

The case where the light reception section 30 is located adjacent to the light source 6 and receives the diffuse light 3e which has passed through the diffuser panel 7 has been described above (see FIG. 8). However, the light reception section 30 may be located at any position as long as the light reception section 30 receives a part of the diffuse light which is diffused by the diffuser panel 7. Note that it is preferable that the light reception section 30 is located outside the transmission possible range 4 for not blocking the transmission light 10.

Instead of the hard discs 20 and 33, a medium such as a semiconductor memory which can electrically store data, and the like may be used.

While the invention has been described in detail, the foregoing description is in all aspects illustrative and not restrictive. It is understood that numerous other modifications and variations can be devised without departing from the scope of the invention.

What is claimed is:

1. An optical space transmission system comprising an optical transmitter and a terminal, wherein the optical transmitter transmits data from the optical transmitter to the terminal by means of optical space transmission using a beam of a wavelength of an infrared light region,
   wherein the terminal comprises:
      a visible light transmission section operable to emit a beam of a wavelength of a visible light region; and
      a first light reception section operable to receive the beam of the wavelength of the infrared light region, and
   wherein the optical transmitter comprises:
      an incident beam restriction section operable to transmit the beam of the wavelength of the visible light region emitted by the terminal only if the terminal is located within a range in which the beam of the wavelength of the infrared light region emitted by the optical transmitter would be incident upon the terminal;
      a reflection section operable to reflect the beam of the wavelength of the visible light region transmitted by the incident beam restriction section;
      a second light reception section operable to receive a data transmission request signal from the terminal; and
      a light source operable to emit the beam of the wavelength of the infrared light region to pass through the reflection section after the second light reception section receives the data transmission request signal.

2. The optical space transmission system according to claim 1, wherein the reflection section is a half mirror which transmits a part of light.

3. The optical space transmission system according to claim 1, wherein the reflection section is a diffuser panel which diffuses light.

4. The optical space transmission system according to claim 3, wherein the second light reception section receives the data transmission request signal as a part of the beam of the wavelength of the visible light region diffused by the diffuser panel.

5. The optical space transmission system according to claim 1, wherein the reflection section is a diffuser panel which transmits the beam of the wavelength of the infrared light region and diffuses the beam of the wavelength of the visible light region.

6. The optical space transmission system according to claim 5, wherein the second light reception section receives the data transmission request signal as a part of the beam of the wavelength of the visible light region diffused by the diffuser panel.

7. The optical space transmission system according to claim 1, wherein the incident beam restriction section is a lens.

8. The optical space transmission system according to claim 1, wherein the incident beam restriction section is a light control film capable of setting transmission loss according to an incident angle of light.

9. The optical space transmission system according to claim 1, wherein the incident beam restriction section is an interference filter capable of setting transmission loss according to an incident angle of light.

10. An optical transmitter for performing data transmission to a terminal by means of optical space transmission using a beam of a wavelength of an infrared light region, the optical transmitter comprising:
    an incident beam restriction section operable to transmit a beam of a wavelength of a visible light region emitted by the terminal only if the terminal is located within a range in which the beam of the wavelength of the infrared light region emitted by the optical transmitter would be incident upon the terminal;
    a reflection section operable to reflect the beam of the wavelength of the visible light region transmitted by the incident beam restriction section; and
    a light source operable to emit the beam of the wavelength of the infrared light region to pass through the reflection section according to a data transmission request signal from the terminal.

11. The optical transmitter according to claim 10, wherein the reflection section is a half mirror which transmits a part of light.

12. The optical transmitter according to claim 10, wherein the reflection section is a diffuser panel which diffuses light.

13. The optical transmitter according to claim 12, further comprising a light reception section operable to receive the data transmission request signal as a part of the beam of the wavelength of the visible light region diffused by the diffuser panel,
    wherein the light source emits the beam of the wavelength of the infrared light region to pass through the reflection section according to the data transmission request signal received by the light reception section.

14. The optical transmitter according to claim 10, wherein the reflection section is a diffuser panel which transmits the beam of the wavelength of the infrared light region and diffuses the beam of the wavelength of the visible light region.

15. The optical transmitter according to claim 14, further comprising a light reception section operable to receive the data transmission request signal as a part of the beam of the wavelength of the visible light region diffused by the diffuser panel,
    wherein the light source emits the beam of the wavelength of the infrared light region to pass through the reflection section according to the data transmission request signal received by the light reception section.

16. The optical transmitter according to claim 10, wherein the incident beam restriction section is a lens.

17. The optical transmitter according to claim 10, wherein the incident beam restriction section is a light control film capable of setting transmission loss according to an incident angle of light.

18. The optical transmitter according to claim 10, wherein the incident beam restriction section is an interference filter capable of setting transmission loss according to an incident angle of light.

19. An optical transmitter for performing data transmission to a terminal by means of optical space transmission using a beam of a wavelength of an infrared light region, the optical transmitter comprising:
    an incident beam restriction section operable to transmit a beam of a wavelength of a visible light region emitted by the terminal only if the terminal is located within a range in which the beam of the wavelength of the infrared light region emitted by the optical transmitter would be incident upon the terminal;
    a reflection section operable to reflect the beam of the wavelength of the visible light region transmitted by the incident beam restriction section; and
    a light source operable to emit the beam of the wavelength of the infrared light region to pass through the reflection section.

* * * * *